(12) United States Patent
Artsi

(10) Patent No.: US 6,838,907 B1
(45) Date of Patent: Jan. 4, 2005

(54) SUPPLYING LOGIC VALUES FOR SAMPLING ON HIGH-SPEED INTERFACES

(75) Inventor: Liav Ben Artsi, Kiryat-Yam (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 0 days.

(21) Appl. No.: 10/376,571

(22) Filed: Feb. 27, 2003

(51) Int. Cl.[7] ............... H03K 17/16; H03K 19/003; H03K 19/0175
(52) U.S. Cl. .................... 326/82; 326/30
(58) Field of Search ............... 326/82, 30, 86; 340/310.03; 710/100, 107; 714/57; 327/112, 108; 363/22

(56) References Cited

U.S. PATENT DOCUMENTS

| | | | | |
|---|---|---|---|---|
| 3,832,575 A | * | 8/1974 | Dasgupta et al. | 326/30 |
| 5,404,498 A | * | 4/1995 | Tanaka et al. | 714/57 |
| 5,412,369 A | * | 5/1995 | Kirchner | 340/310.03 |
| 5,467,455 A | * | 11/1995 | Gay et al. | 710/100 |
| 5,789,937 A | * | 8/1998 | Cao et al. | 326/30 |
| 5,812,001 A | | 9/1998 | Imamiya | |
| 6,141,764 A | | 10/2000 | Ezell | |
| 6,278,300 B1 | * | 8/2001 | Urakawa | 327/112 |
| 6,307,402 B1 | * | 10/2001 | Hedberg | 326/86 |
| 6,343,024 B1 | * | 1/2002 | Zabroda | 363/22 |
| 6,346,834 B1 | | 2/2002 | Chai | |
| 6,362,678 B1 | | 3/2002 | Bosnyak et al. | |
| 6,509,755 B2 | * | 1/2003 | Hernandez-Marti | 326/30 |
| 2001/0010489 A1 | | 8/2001 | Kato et al. | |

* cited by examiner

Primary Examiner—Patrick Wamsley

(57) ABSTRACT

A method and circuit that supplies valid logic values at an end of a transmission line for sampling on high speed interfaces, such as HSTL and SSTL, during reset. The circuit may include operational amplifiers and resistors.

49 Claims, 4 Drawing Sheets

US 6,838,907 B1

SUPPLYING LOGIC VALUES FOR SAMPLING ON HIGH-SPEED INTERFACES

BACKGROUND

Memory drivers, system controllers and transceivers may use an interface signal standard for digital integrated circuits, such as High Speed Transistor Logic (HSTL) (also called High Speed Transceiver Logic) or Stub-Series Transceiver Logic (SSTL)(also called Stub-Series Terminated Logic). The HSTL standard may use input/output (I/O) structures, such as differential amplifier inputs with one input internally tied to a usersupplied input reference voltage, and outputs with output power supply inputs (VCCO/VDDQ).

With HSTL, a high logic output ("1" or VOH) may be represented by a voltage of about 0.95–1.5V volts. A low logic output ("0" or VOL) may represented by a voltage of about 0.55 volts or even lower. The rise and fall times for transitions between logical levels can be as low as 200 to 300 picoseconds (ps).

The application relates to a method and circuit for supplying valid logic values for sampling on high speed interfaces during a reset.

The circuit may use a Thevenin termination methodology to supply a required termination resistor during "normal" operation, while still supplying valid low or high logic values for sampling during "reset."

The circuit may supply logic values to a microchip that samples during reset on the 10 Gigabit Media Independent Interface (XGMII) operating in HSTL, for example.

An aspect of the application relates to an apparatus comprising first and second termination impedances coupled to a first end of a transmission line and a driver circuit coupled to the first impedance. The driver circuit is configured to supply a first pre-determined voltage level to the first impedance during a normal mode and supply a second pre-determined voltage level to the first impedance during a reset mode. The pre-determined voltage levels cause a logic value to be available for sampling during reset on a second end of the transmission line.

Another aspect relates to a method of supplying termination voltages to a transmission line. The method comprises supplying a first pre-determined voltage level to a first impedance coupled to a first end of a transmission line during a normal mode; and supplying a second pre-determined voltage level to the first impedance during a reset mode. The pre-determined voltage levels cause a logic value to be present for sampling during reset on a second end of the transmission line.

The methods and circuits described herein may be used with memory drivers, transceivers, system controllers, packet processors and other devices.

DETAILED DESCRIPTION

Figure 1:
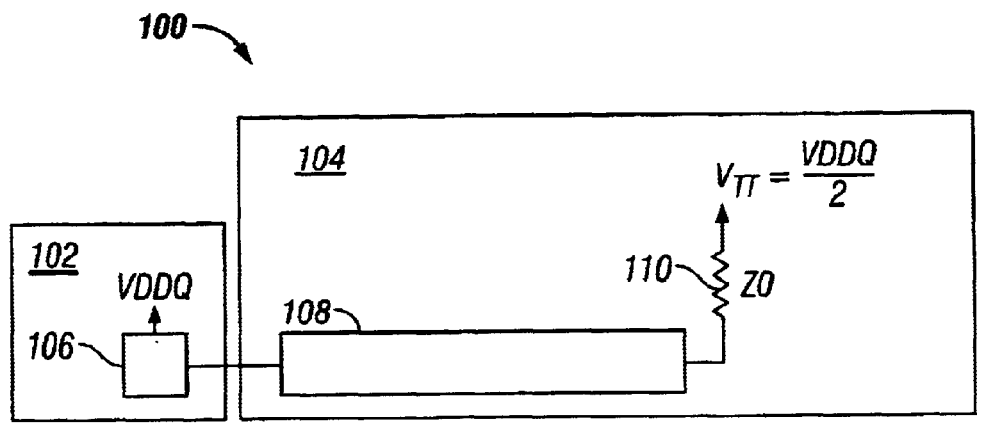
FIG. 1 illustrates an integrated circuit, chip or device and a printed circuit board (PCB).

FIG. 1 illustrates an integrated circuit, chip or device 102 and a printed circuit board (PCB) 104. The chip or device 102 may be, for example, a memory driver, a transceiver, a system controller or a packet processor.

The, chip or device 102 includes an output connection 106 (also called a "pad"). The output connection 106 is coupled to a transmission line 108, which terminates in a termination resistor 110, which is coupled to a voltage source VTT. The output connection 106 and transmission line 108 may operate according to the HSTL standard or the SSTL standard or any other possible standard that requires a termination resistor to a voltage other than ground.

The circuit board 104 in FIG. 1 may supply logic values on the line 108 to the device 102. The device 102 may sample a logic value on the HSTL or SSTL output connection 106 (coupled to the line 108) during a "reset" to determine any desired hardware configured operation mode, configuration and other things.

High speed signal standards, such as HSTL and SSTL, may demand termination bias VTT at half of the supply voltage VDDQ (VTT=VDDQ/2) HSTL and SSTL pads and line topologies may expect a characteristic line impedance Z0 (e.g., 50 Ohm) and a termination resistor 110 to VTT= VDDQ/2 at the far end of the line 108. For example, for HSTL, VDDQ=1.5V, VTT=VDDQ/2=1.5V/2=0.75V. For SSTL, VDDQ=2.5V, VTT=2.5V/2=1.25V.

Conventional circuit board designs only have a pull-up or pull-down resistor to supply the desired voltage to be sampled during reset. The line 108 will not answer the required HSTL or SSTL termination requirements during normal operation. If a Z0 resistor 110 is installed at the end of the line 108 to half the voltage, the circuit 104 cannot have any other voltage other than VTT to be sampled during reset without damaging the termination quality.

The Z0 termination resistor 110 to VTT=VDDQ/2 makes it difficult to use a simple pull-up or pull-down resistor at the end of the transmission line 108 to provide a valid logic value during a "reset" mode. Supplying valid logic values to signals (operating in high speed standards) for sampling during reset may be a problem because the termination resistor 110 is typically smaller (i.e., stronger) than any "pull up" or "pull down" resistor that may be used externally to supply the logic value for reset. As a result, the value sampled during reset is not a "valid" value, i.e., it does not answer to the Vil or Vih of the SSTL or HSTL standard.

In addition, a simple pull-up/pull-down resistor may change the voltage value the line 108 is connected to via termination, as well as change the equivalent resistance value of the termination resistor 110, which decreases the termination quality and accuracy.

For example, a pull-up resistor with a value of 4.7K Ohm to 1.5V voltage source on a line 108 in FIG. 1 with a 50 Ohm termination to 0.75V voltage source results in a voltage of 0.75789V, which is not a valid logic value. "Zero" or "one" is "valid" according to SSTL or HSTL Vil or Vih or according to the pad specification of Vih and Vil.

Figure 2:
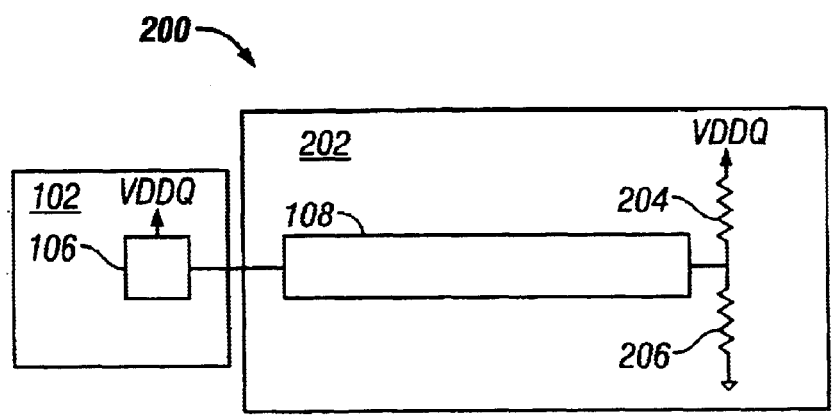
FIG. 2 illustrates the device of FIG. 1 and a circuit board configuration with a Thevenin termination.

FIG. 2 illustrates the device 102 of FIG. 1 and a circuit board configuration 202 with a Thevenin termination. One way to supply a valid termination topology at the connection 106 is to use a Thevenin termination shown in FIG. 2. In FIG. 2, one resistor 204 is coupled to a high voltage level, such as VDDQ, and another resistor 206 is coupled to ground. If the resistors 204, 206 are sufficiently accurate and of the same value, this configuration makes the termination voltage (of the line 108 between the two resistors 204, 206) approximately equal to half the high voltage VDDQ (across the resistors 204, 206).

An aspect of the application relates to a method and apparatus of shifting voltages supplied to Thevenin termination resistors to provide a valid logic value at the connection 106 to be sampled during reset.

Figure 3:
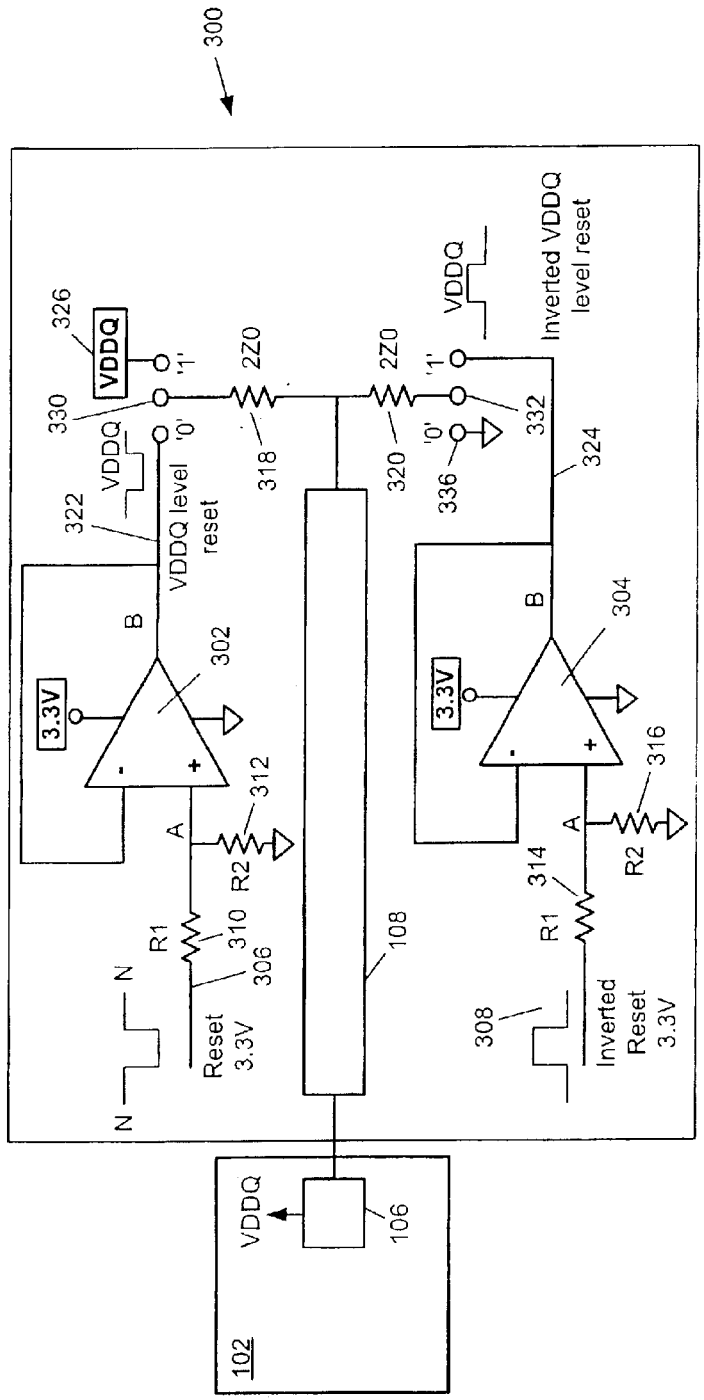
FIG. 3 illustrates the device of FIG. 1 and a circuit board configuration with a selectable Thevenin termination.

FIG. 3 illustrates the device 102 of FIG. 1 and a circuit board configuration 300 (also called "circuit") with a selectable Thevenin termination. The circuit board configuration 300 comprises a first operational amplifier (op amp) 302, a second op amp 304, a normal/reset input line 306, an inverted reset line 308, a plurality of resistors 310–320, a VDDQ level reset line 322, an inverted VDDQ level reset 324, a first terminal 330, a second terminal 332, a selectable VDDQ source terminal 326, and a selectable ground terminal 336. The transmission line 108 is coupled between the two resistors 318, 320.

In general, the board configuration 300 is configured to supply valid logic voltage values (pull-up or pull-down) on the connection 106 for sampling during reset for high-speed interfaces. The resistors 310–316 and op amps 302, 304 may be called driver circuits.

Figure 4:
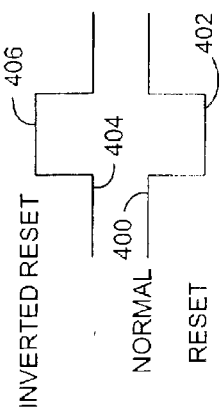
FIG. 4 illustrates examples of normal, reset and inverted reset voltage signals applied to input lines in FIG. 3.

FIG. 4 illustrates examples of reset and inverted reset voltage signals applied to the lines 306, 308 in FIG. 3. The signals show voltage levels 400, 404 applied during "normal" operation and voltage levels 402, 406 applied during "reset."

Voltage supplies or programmable logic devices (PLDs) (not shown) may supply the normal reset and inverted reset voltage levels on lines 306 and 308. The voltage drop of 3.3V is across resistors R1 and R2, which act as voltage dividers. Other voltage values may be used.

The values of resistors R1 and R2 310–316 may be adjusted to attain a desired voltage value of VDDQ level reset and inverted VDDQ level reset at lines 322, 324. There may be many resistor values that meet the desired resistance ratio.

If a user-selectable connection is desired to couple the first terminal 330 to the line 322 or the VDDQ voltage source 326 and the second terminal 332 to line 324 or ground 336, a user may implement a "jumper" and change the connections from time to time. If a one-time connection is desired, a user may implement a zero-ohm resistor (or even directly connect the two by a transmission line) to couple the first terminal 330 to the line 322 or the source 326 and the second terminal 332 to the line 324 or ground 336. A zero-ohm resistor provides a better waveform than a jumper in means of signal integrity.

A device (not shown) may operate switches or jumpers to selectively couple the first terminal 330 to the line 322 or the VDDQ source 326 and the second terminal 332 to the line 324 or ground 336.

The board configuration 300 may provide the following conditions:

Valid logic values: input voltage that is higher than Vih or lower than Vil. For example, VDDQ 1.5V or 2.5V (for HSTL or SSTL respectively) or zero to the connection 106 operating in HSTL/SSTL during a standard "reset."

A valid termination to VTT=VDDQ/2 during "normal" operation by utilizing a Thevenin termination, instead of a resistor to VTT as in FIG. 1.

The voltage at point A (for both reset and inverted reset lines 306, 308) is achieved by a voltage divider between resistors R1 and R2. The VDDQ reset and inverted VDDQ reset voltage signals at the B output lines 322 and 324 have the same waveform as the reset and inverted reset voltage signals applied to the input lines 306 and 308. The high voltage level at the B output lines 322 and 324 is VDDQ instead of 3.3V.

Two uni-buffers (two unity-gain buffers/op amps) 302, 304) are used to push the termination resistors 318, 320 and avoid the resistors' influence on the supplied VDDQ reset and inverted VDDQ reset voltages. Due to the implementation of the uni-buffers 302, 304, the voltages at point B on lines 322, 324 follow the voltage on point A and are not influenced by the signals on the transmission line 108.

During "normal" operation (as opposed to "reset"), one of the termination resistors (e.g., 318) is pulled high to VDDQ, and the other termination resistor (e.g., 320) is pulled low to 0V. This produces a Thevenin termination resistor equal to 2Z0 in parallel to 2Z0=Z0 to a voltage of VTT=VDDQ/2.

When connecting two jumpers (or any other selected connection as described above) on the "0" terminals 322, 336 and the first and second terminals 330, 332 in FIG. 3, both termination resistors 318, 320 are supplied with 0V during reset (see reset waveform 400 in FIG. 4). The supply voltage to the first termination resistor 318 changes from VDDQ to 0V during reset. This provides a Z0 resistor (2Z0 parallel to 2Z0) with 0V (Thevenin termination voltage) and a valid logic value sampling of "0" at the connection 106 during reset.

When connecting two jumpers on the "1" terminals 326, 324 and the first and second terminals 330, 332 in FIG. 3, both termination resistors 318, 320 are supplied with VDDQ during reset (see inverted reset waveform 404 in FIG. 4). The supply voltage to the second termination resistor 320 changes from 0V to VDDQ during reset. This provides a Z0 resistor (2Z0 parallel to 2Z0) with VDDQ and a valid logic value sampling of "1" at the connection 106 during reset.

An improper configuration of the jumpers (one on a "0" terminal, and the other on a "1" terminal) does not result in any damage to the circuit 300, to the line 108 or to an integrated circuit device 102 connected to the line 108. However, the line 108 is supplied with Thevenin termination resistor to VDDQ/2 with no consideration made for the reset signal. In this case, the circuit 300 would not provide valid logic values for sampling during reset.

Although an external reset signal supplied to the device 102 may revert to "1," this does not mean that the device 102 has finished its reset sequence and that it has sampled the value at connection 106 as needed. To ensure that the device 102 samples the correct value, the reset signal supplied to the circuit 300 on line 306 should revert to "1," and the inverted-reset on line 308 should revert to "0," only after the sampling device 102 has indicated that it has completed its reset sequence. The small delay desired may be done in other ways.

As an example, the circuit 300 can release the signals for some switching devices, such as Marvell Semiconductor's switching devices, when the devices start toggling the MDC signal (an output signal name management data clock (SMI)) or 200 ns after the external reset is asserted. One can implement this dependency between the two reset signals and the MDC or the external reset by driving both reset and inverted-reset signals on lines 306 and 308 with a programmable logic device (PLD). No other device should be driving the line 108 at the same time.

For example, for the Marvell Prestera 98MX630/98EX130 Ethernet switching packet processors, the lines that use HSTL/SSTL standards and sample during reset are L0_Txd[0-1]. The device 102 does not drive any value on the line 108 before the link-up is established by Auto-Negotiation, i.e., MDC should toggle first.

Figure 6:
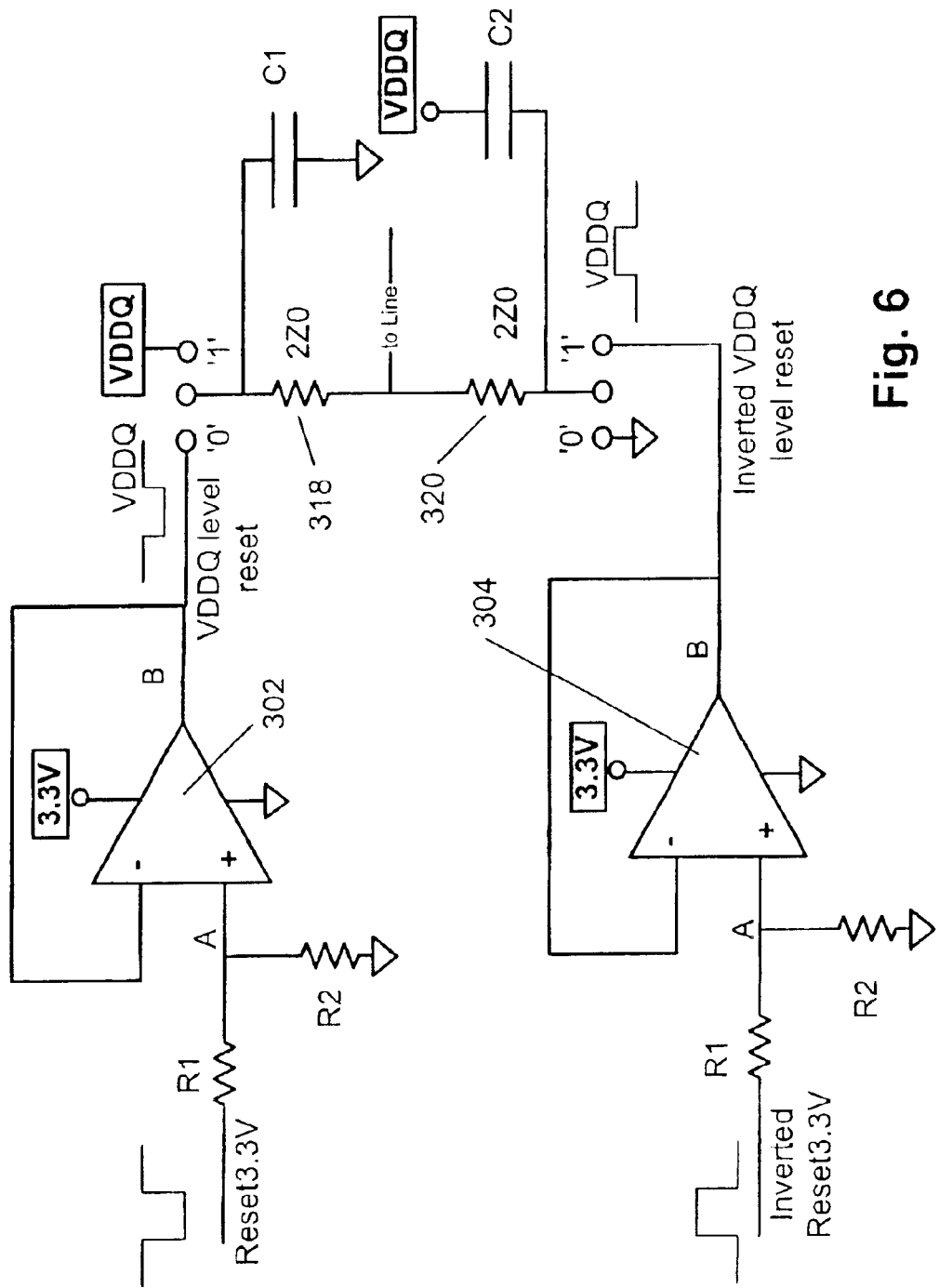
FIG. 6 illustrates the device and circuit board configuration of FIG. 3 with decoupling capacitors.

FIG. 6 illustrates the circuit board configuration 300 of FIG. 3 with decoupling capacitors C1 and C2. An implementation of the circuit board 300 in FIG. 3 may include two or more decoupling capacitors C1 and C2 to supply signal toggling on the transmission line 108 in FIG. 3 (sent by the device 102, by the output pad 106) with a short length return path, as well as stabilize the voltage on the Thevenin termination resistors 318, 320. The capacitors may provide a better way for the return current for signals toggling on the transmission line 108. Each capacitor may have a value around 1 nF.

Figure 5:
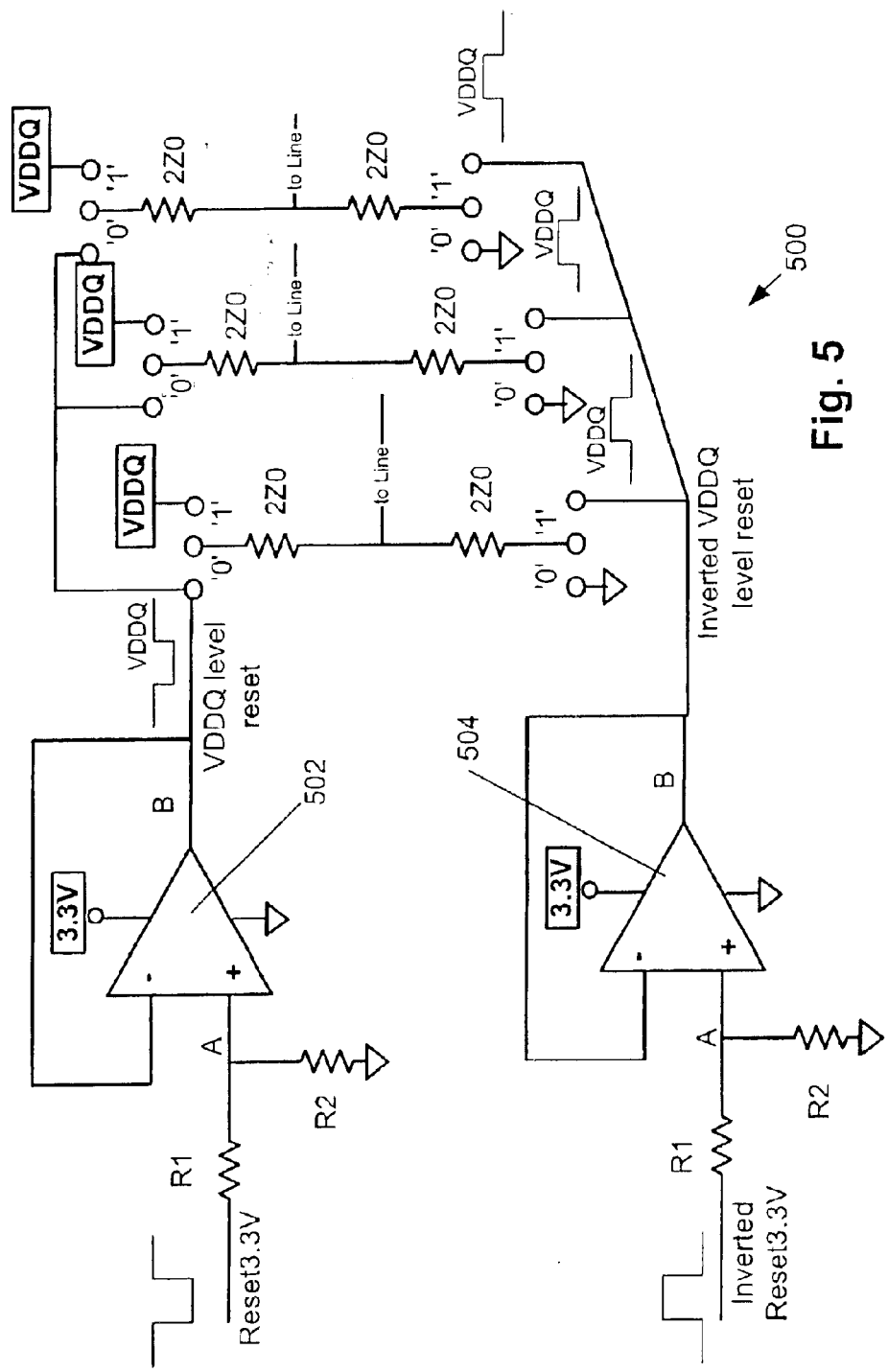
FIG. 5 illustrates a circuit with a plurality of selectable Thevenin terminations for a plurality of lines.

The circuit board 500 of FIG. 5 may also have a capacitor for each Thevenin termination resistor. The capacitors' values may change if multiple capacitors are used, as well as multiple lines but their function may stay the same. For example, in a circuit board configuration with three transmission lines (FIG. 5) and a capacitor for each Thevenin termination resistor, each capacitor may have a value of about 300 pF (in order not to overload the uni-buffer 502, 504).

The present application is not limited to the board configuration 300 in FIG. 3. In other embodiments, the op amps 302, 304 and/or resistors 310–316 may be replaced with other components to supply the desired VDDQ level reset and inverted VDDQ level reset signals on lines 322 and 324 respectively. For example, another embodiment uses voltage converters instead of two unity buffers. Another embodiment uses only one unity buffer if only one logic value ("0" or "1") is desired.

The circuit 300 in FIG. 3 may drive one line 108 coupled to an HSTL or SSTL pad. To drive more than one line, one may duplicate the two 3-pin jumpers in FIG. 3 and two resistors per additional line, as shown in FIG. 5.

FIG. 5 illustrates a circuit 500 with a plurality of selectable Thevenin terminations for a plurality of lines. No other circuitry is needed as long as the uni-buffer 502, 504 is capable of driving/sinking the total current.

The methodology described herein can be implemented for any other interface standard utilizing a termination resistor. To use this methodology, the two termination resistors should be twice the value of that specified by the interface standard, and the voltage divider derives the VDDQ needed for sampling.

A number of embodiments have been described. Nevertheless, it will be understood that various modifications may be made without departing from the spirit and scope of the application. Accordingly, other embodiments are within the scope of the following claims.

What is claimed is:

1. An apparatus adapted to be coupled with a transmission line, and comprising:
   first and second termination impedances having a connection node therebetween, which node is adapted for connection with the transmission line; and
   a first driver circuit coupled to the first impedance, configured to supply a first voltage level to the first impedance during a normal mode and a supply a second voltage level different from the first voltage level to the first impedance during a reset mode,
   the voltage levels being selected to allow a logic value to be available for sampling during reset on a second end of the transmission line.

2. The apparatus of claim 1, further comprising a second driver circuit coupled to the second impedance, wherein the second driver circuit is configured to supply the second pre-determined voltage level to the second impedance during the normal mode and supply the first pre-determined voltage level to the second impedance during the reset mode, the pre-determined voltage levels causing a logic value to be available for sampling during reset on the second end of the transmission line.

3. The apparatus of claim 2, wherein the second driver circuit comprises an operational amplifier.

4. The apparatus of claim 2, wherein the second driver circuit provides a low voltage value during the normal mode and a high voltage value during the reset mode.

5. The apparatus of claim 1, wherein the driver circuit comprises an operational amplifier having an output that drives the first impedance to the first and second voltage levels, independent of a voltage on said transmission line.

6. The apparatus of claim 1, wherein the driver circuit comprises a voltage driver.

7. The apparatus of claim 1, wherein the driver circuit provides a high voltage value during the normal mode and a low voltage value during the reset mode.

8. The apparatus of claim 1, wherein the driver circuit provides a low voltage value during the normal mode and a high voltage value during the reset mode.

9. The apparatus of claim 1, further comprising a switching part configured to selectably couple the first impedance either to the driver circuit or a constant voltage source.

10. The apparatus of claim 1, further comprising a component configured to selectably couple the first impedance to the driver circuit or a ground terminal.

11. The apparatus of claim 1, wherein the second impedance is coupled to a ground terminal.

12. The apparatus of claim 1, wherein the first and second impedances are each equal to twice a characteristic impedance of the transmission line.

13. The apparatus of claim 1, wherein the first and second impedances are each equal to twice a characteristic impedance of the transmission line specified by the High Speed Transistor Logic (HSTL) standard.

14. The apparatus of claim 1, wherein the first and second impedances are each equal to twice a characteristic impedance of the transmission line specified by the Stub-Series Transceiver Logic (SSTL) standard.

15. The apparatus of claim 1, further comprising first and second decoupling capacitors coupled to the first and second impedances, the decoupling capacitors being configured to supply signal toggling on the transmission line.

16. The apparatus of claim 1, wherein the apparatus is a circuit board.

17. The apparatus of claim 1, further comprising:
   third and fourth impedances coupled to a first end of a second transmission line; and
   a second driver circuit coupled to the third impedance, wherein the second driver circuit is configured to supply a third pre-determined voltage level to the third impedance during a normal mode and supply a fourth pre-determined voltage level to the third impedance during a reset mode, the pre-determined voltage levels causing a logic value to be available for sampling during reset on a second end of the second transmission line.

18. An apparatus as in claim 1, further comprising
   a second driver circuit coupled to the second impedance, configured to supply a first voltage level to the second impedance during a normal mode and supply a second voltage level to the second impedance during a reset mode.

19. A method of supplying termination voltages to a transmission line, the method comprising:
   supplying a first pre-determined voltage level to a first impedance coupled to a first end of a transmission line during a normal mode; and
   supplying a second pre-determined voltage level different from the first predetermined voltage level to the first impedance during a reset mode, the pre-determined voltage levels causing a logic value to be present for sampling during reset on a second end of the transmission line.

20. A method as in claim 19, wherein there is a second impedance coupled to the first impedance, and said supplying the first voltage and supplying a second voltage each supply voltages to said first impedance.

21. A method as in claim 20, wherein said supplying a first voltage and supplying a second voltage supplying output voltages that are independent of the voltage on the transmission line.

22. A method as in claim 20, further comprising using a second driver to supply a first voltage level to said second impedance during a normal mode, and to supply a second voltage level to said second impedance during a reset mode.

23. The method of claim 19, further comprising sampling a logic value at the second end of the transmission line.

24. The method of claim 19, wherein the first pre-determined voltage level comprises a high voltage value during the normal mode and the second pre-determined voltage level comprises a low voltage value during the reset mode.

25. The method of claim 19, wherein the first pre-determined voltage level comprises a low voltage value during the normal mode and the second pre-determined voltage level comprises a high voltage value during the reset mode.

26. The method of claim 19, further comprising switching an end of the first termination impedance between a voltage driver circuit and a constant voltage supply.

27. The method of claim 19, further comprising switching an end of the first termination impedance between a voltage driver circuit and a ground terminal.

28. The method of claim 19, further comprising grounding a second impedance coupled to the transmission line, wherein the first and second impedances are each equal to a characteristic impedance of the transmission line.

29. The method of claim 19, further comprising:
supplying the second pre-determined voltage level to a second impedance coupled to the first end of the transmission line during the normal mode; and
supplying the first pre-determined voltage level to the second impedance during the reset mode.

30. The method of claim 19, further comprising selecting a value of first and second impedances coupled to the transmission line to be twice a characteristic impedance of the transmission line.

31. The method of claim 19, further comprising supplying signal toggling on the transmission line.

32. The method of claim 19, further comprising:
supplying a third pre-determined voltage level to a third impedance coupled to a first end of a second transmission line during the normal mode; and
supplying a fourth pre-determined voltage level to the third impedance during the reset mode.

33. An apparatus adapted to be coupled with a transmission line, and comprising:
first and second impedance having a node therebetween which forms a means for terminating a first end of a transmission line;
a means for driving voltages coupled to the first impedance, for supplying a first voltage level to the first impedance during a normal mode and for supplying a second voltage level different from the first voltage level, to the first impedance during a reset mode; and
a second driver circuit for supplying the pre-determined voltage levels, causing a logic value to be available for sampling during reset on a second end of the transmission line.

34. The apparatus of claim 33, further comprising a second driving means coupled to the second impedance, wherein the second driving means is configured to supply the second pre-determined voltage level to the second impedance during the normal mode and supply the first pre-determined voltage level to the second impedance during the reset mode, the predetermined voltage levels causing a logic value to be available for sampling during reset on the second end of the transmission line.

35. The apparatus of claim 34, wherein the second driving means comprises an operational amplifier.

36. The apparatus of claim 34, wherein the second driving means provides a low voltage value during the normal mode and a high voltage value during the reset mode.

37. The apparatus of claim 33, wherein the driving means comprises an operational amplifier.

38. The apparatus of claim 33, wherein the driving means comprises a voltage divider.

39. The apparatus of claim 33, wherein the driving means provides a high voltage value during the normal mode and a low voltage value during the reset mode.

40. The apparatus of claim 33, wherein the driving means provides a low voltage value during the normal mode and a high voltage value during the reset mode.

41. The apparatus of claim 33, further comprising a means for selectably coupling the first impedance to the driver circuit or a constant voltage source.

42. The apparatus of claim 33, further comprising a means for selectably coupling the first impedance to the driver circuit or a ground terminal.

43. The apparatus of claim 33, wherein the second impedance is coupled to a ground terminal.

44. The apparatus of claim 33, wherein the first and second impedances are each equal to twice a characteristic impedance of the transmission line.

45. The apparatus of claim 33, wherein the first and second impedances are each equal to twice a characteristic impedance of the transmission line specified by the High Speed Transistor Logic (HSTL) standard.

46. The apparatus of claim 33, wherein the first and second impedances are each equal to twice a characteristic impedance of the transmission line specified by the Stub-Series Transceiver Logic (SSTL) standard.

47. The apparatus of claim 33, further comprising first and second decoupling means coupled to the first and second impedances, the decoupling means being configured to supply signal toggling on the transmission line.

48. The apparatus of claim 33, wherein the apparatus is a circuit board.

49. The apparatus of claim 33, further comprising:
third and fourth impedances coupled to a first end of a second transmission line; and
a second driving means coupled to the third impedance, wherein the second driving means is configured to supply a third pre-determined voltage level to the third impedance during a normal mode and supply a fourth pre-determined voltage level to the third impedance during a reset mode, the pre-determined voltage levels causing a logic value to be available for sampling during reset on a second end of the second transmission line.

* * * * *